(No Model.)
G. T. WILSON.
FRONT GEAR FOR WAGONS.
No. 306,451. Patented Oct. 14, 1884.
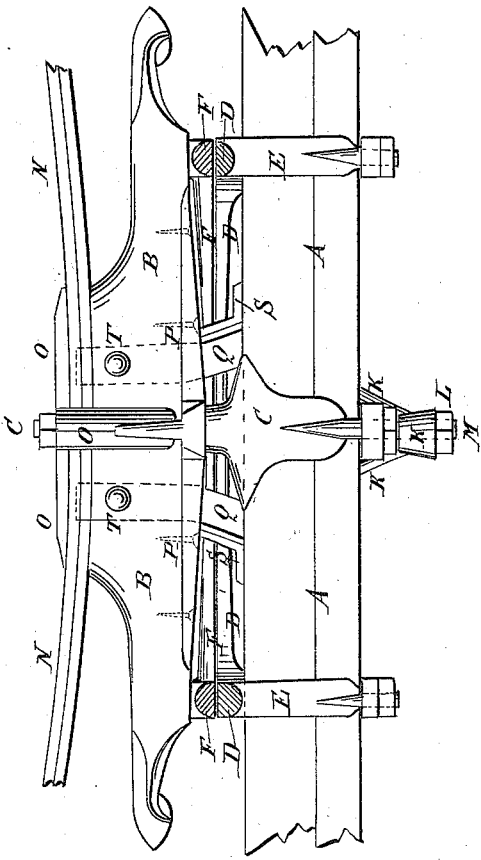
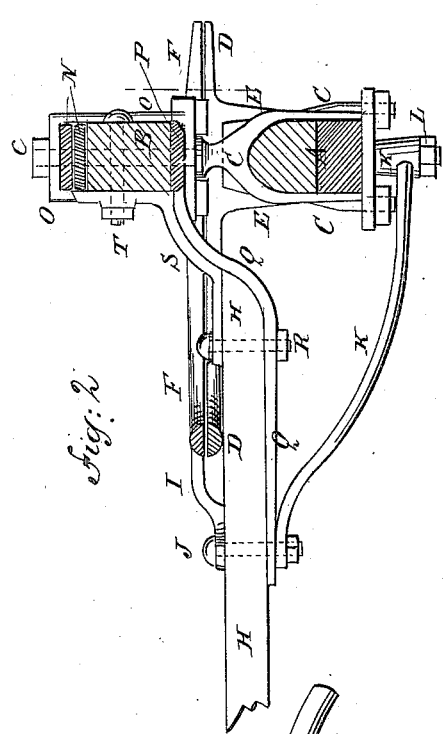
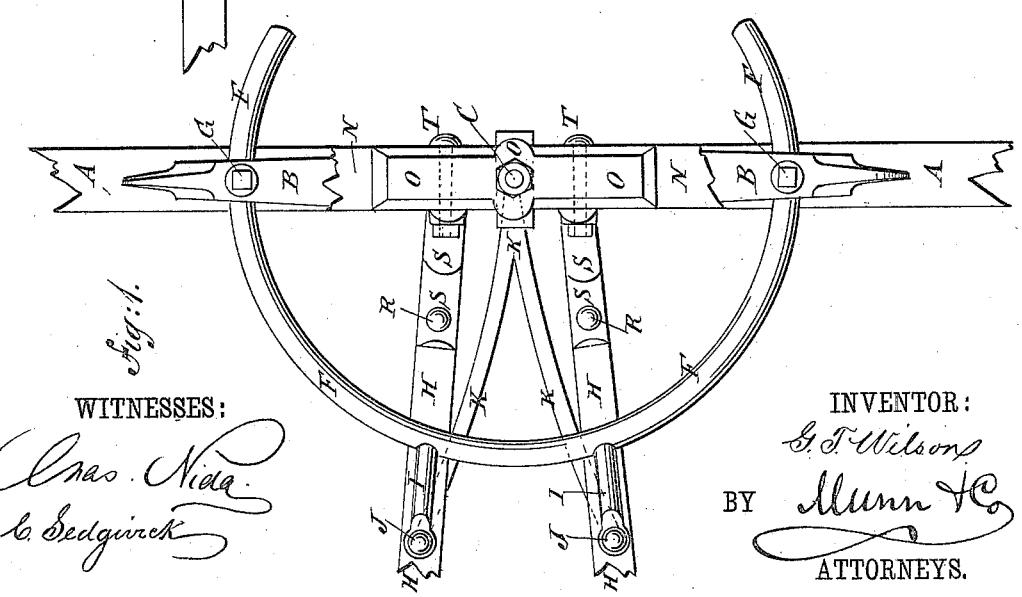
WITNESSES:
INVENTOR:
G. T. Wilson
BY Munn & Co.
ATTORNEYS.

UNITED STATES PATENT OFFICE.

GEORGE T. WILSON, OF WATERTOWN, ASSIGNOR TO HENRY W. PELL, OF ROME, NEW YORK.

FRONT GEAR FOR WAGONS.

SPECIFICATION forming part of Letters Patent No. 306,451, dated October 14, 1884.

Application filed December 3, 1883. (No model.)

*To all whom it may concern:*

Be it known that I, GEORGE T. WILSON, of Watertown, in the county of Jefferson and State of New York, have invented a new and useful Improvement in Front Gears for Wagons, of which the following is a full, clear, and exact description.

Reference is to be had to the accompanying drawings, forming a part of this specification, in which similar letters of reference indicate corresponding parts in all the figures.

Figure 1 is a plan view of the front gear of a wagon to which my improvement has been applied, parts being broken away. Fig. 2 is a sectional side elevation of the same. Fig. 3 is a front elevation of the same, the fifth-wheel being shown in section.

The object of this invention is to facilitate and cheapen the construction of double-reach buggies and other wagons.

The invention consists in a front gear for wagons constructed with a plate fitted to the bottom of the head-block, and having arms curved to fit the forward end and the lower side of a reach, and with bars bent to fit the upper side of the reach, the curved arms, and the rear side of the head-block, whereby a neat and strong connection is made between the reach and head-block, as will be hereinafter fully described.

A represents the axle, and B the head-block, which are connected by the king-bolt C in the ordinary manner.

D is the lower or movable part of the fifth-wheel, which is secured to the axle A by the clips E.

F is the stationary part of the fifth-wheel, which is secured to the head-block B by bolts G and to the parts H of the reach by arms I and the bolts J.

K is the reach-stay, which is secured by a nut, L, to a bolt, M, formed upon the king-bolt yoke. The rear part of the stay K is forked, and the ends of its branches are secured to the parts H of the reach by the bolts J.

N is a part of the spring which is secured to the head-block B by the king-bolt C and the clip O.

As thus far described, there is nothing new in the construction.

To the lower side of the head-block B is fitted a plate, P, which is secured in place by the king-bolt C and the clip O, and which may be further secured in place by screws or bolts, as indicated in dotted lines in Fig. 3.

Upon the plate P are formed two arms or plates, Q, which are curved downward and rearward, and are fitted to the forward ends and lower sides of the parts H of the reach, and are secured to the said parts H by the bolts R and J.

To the upper side of the forward ends of the parts H of the reach are fitted the rear ends of the bars S, which are secured in place by the bolts R. The bars S are curved to fit upon the parts of the arms Q between the ends of the parts H of the reach and the head-block B. The forward parts of the bars S are bent upward to fit against the rear side of the head-block B, and may be extended upward to fit against the rear edge of the part N of the spring, so as to serve as a brace to the head-block and as a stay to the spring. The forward parts of the bars S are secured to the head-block B by bolts T.

This improvement forms a neat and strong connection between the reach and head-block, and avoids the necessity of mortising the head-blocks and of steaming, bending, and drying the reaches.

In using this improvement the manufacturer can have the reach-irons fitted to a form and his reaches made by a shaper, so that a set of irons will fit any reach, and the labor of fitting each set of irons to a particular reach will be avoided.

Having thus described my invention, I claim as new and desire to secure by Letters Patent—

1. The combination, with the parts H of the reach, the head-block B, and the lower part, N, of the spring, of the bars S, bent upwardly beyond the head-block at their forward parts to form a support for the spring, and their curved rearward parts resting upon reach portions H H, and the plate P on the under side of the head-block, provided with the rearward-curved arms Q, fitting upon the under sides of reach portions H H, and bolts passing through arms Q S and reach portions H, for securing them together, substantially as set forth.

2. In combination with the reach, head-block, and spring mounted on the latter, the curved bar S, formed with an extension resting against and projecting above the head-block, to sustain the spring in the position substantially as set forth.

3. In combination with the reach, the head-block and spring mounted on the latter, the arm Q, made integral with the bottom plate, P, of the head-block, and extending forward under the reach to form a shank, the bar S, made separate from the bottom plate, P, and formed with an extension resting against the back of and projecting above the head-block to protect the spring, and having a shank resting on the top of the reach, and an attaching-bolt, T, passing horizontally through the extension of bar S and the head-block, substantially as set forth.

GEORGE T. WILSON.

Witnesses:
C. M. PARIS,
JOSEPH WECKESSER.